Dec. 30, 1924.

R. FEGEBANK

MANURE HOOK

Filed April 7, 1924

1,521,086

Inventor
R. Fegebank
By Clarence A. O'Brien
Attorney

Patented Dec. 30, 1924.

1,521,086

UNITED STATES PATENT OFFICE.

REINHARD FEGEBANK, OF GRANVILLE, IOWA.

MANURE HOOK.

Application filed April 7, 1924. Serial No. 704,784.

*To all whom it may concern:*

Be it known that I, REINHARD FEGEBANK, a citizen of Germany, residing at Granville, in the county of O'Brien and State of Iowa, have invented certain new and useful Improvements in a Manure Hook, of which the following is a specification.

This invention relates to manure hooks and it consists in the novel features hereinafter described and claimed.

An object of the invention is to provide a horse-drawn hook of simple and durable structure adapted to be used about stables for dragging and removing a manure pile.

With this object in view the structure includes a forward cross bar having a draft appliance connected therewith. Tines are pivotally connected at their forward ends with the said cross bar and are disposed at spaced intervals along the same and parallel with each other. A cross bar is disposed transversely across the rear intermediate portions of the said tines and a lever is mounted upon the last mentioned cross bar. A rod is pivotally connected at one end with the intermediate portion of the lever and pivotally connected at its other end with the forward cross bar. In use the downwardly disposed end portions of the tines are brought over the top of the pile of manure. The operator then sets upon the rear cross bar whereby the pointed ends of the tines are forced down into the pile of manure. The fork and the pile of manure are then pulled or drawn away and when it is desired to disconnect the fork from the pile of manure the rear end of the lever is swung forwardly whereby the forward end of the rod which is pivotally connected with the lever becomes a prop or fulcrum and the rear cross bar and the pointed ends of the tines are raised above the pile of manure.

In the accompanying drawing:—

Figure 1:
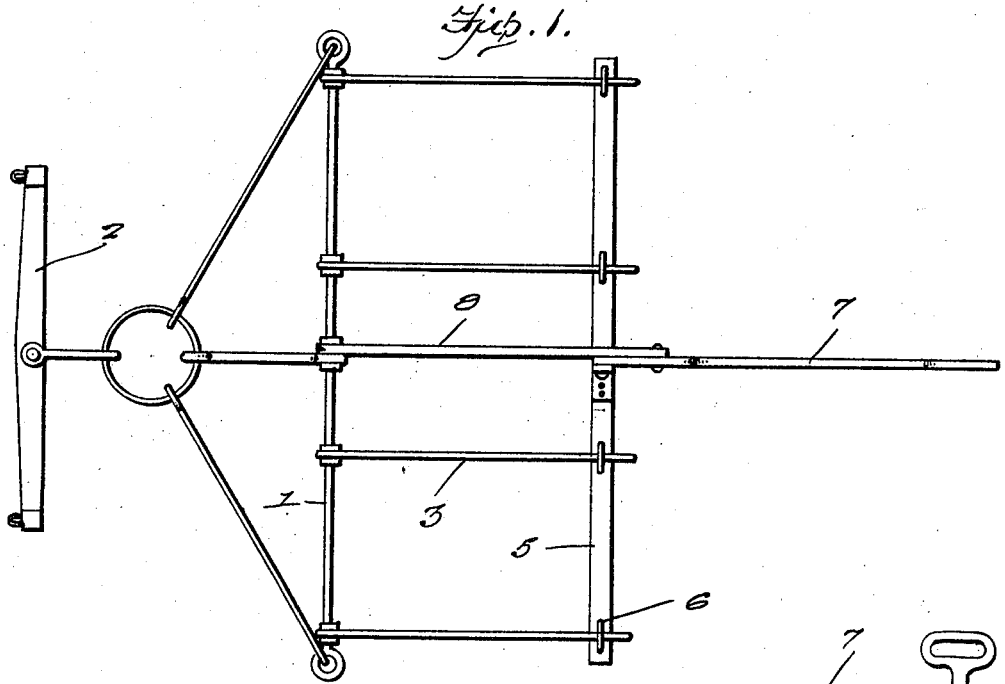
Figure 1 is a top plan view of the manure hook.
Figure 2:
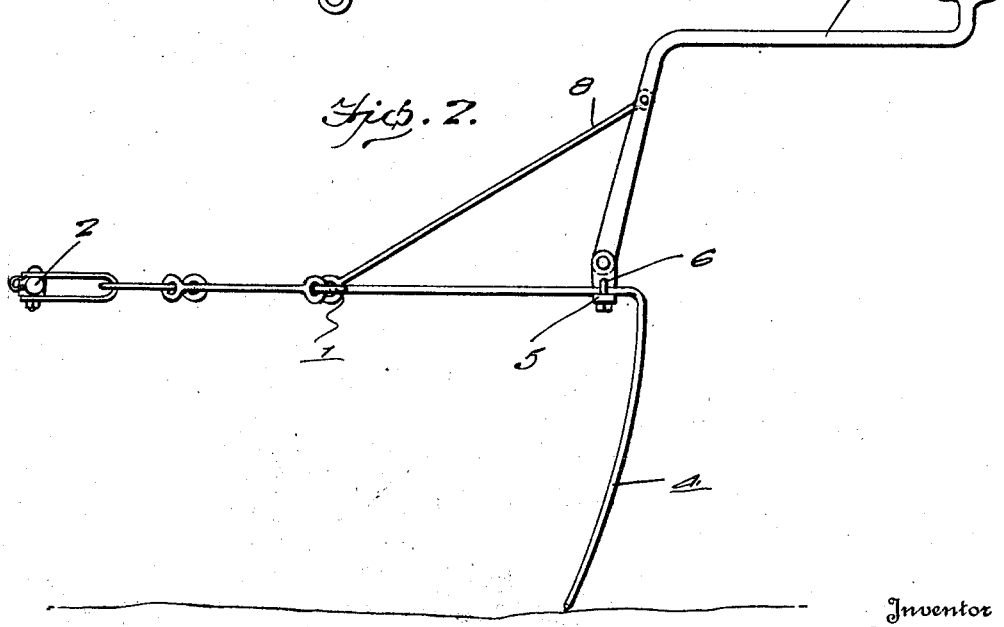
Figure 2 is a side elevation of the same.

The manure hook structure includes a forward cross bar 1 to which is articulated a draft appliance 2 and to which a draft animal may be hitched in a usual manner. Tines 3 are pivotally connected at their forward ends to the cross bar 1 and are arranged in spaced parallel relation thereon. The tines 3 are provided with downwardly disposed pointed end portions 4. The upper and lower portions of the tines are angularly disposed with relation to each other. A cross bar 5 is disposed under the rear portions of the upper parts of the tines 3 and the tines are secured to the cross bar 5 by means of staples 6, a lever 7 is fulcrumed upon the intermediate portion of the cross bar 5 and one end of a rod 8 is pivotally connected with the intermediate portion of the lever 7 and the other end of the said rod 8 is pivotally connected with the intermediate portion of the cross bar 1.

In use the downwardly disposed pointed end portions 4 of the tines are positioned upon a pile of manure. The operator or driver then steps upon the cross bar 5 whereby the pointed end portions 4 of the tines are projected downwardly into the pile of manure, the draft animal (not shown) is then driven whereby the pile is moved and carried with the hook. When it is desired to remove the hook from the pile of manure the rear end of the lever 7 is swung in a forward direction whereby the rod 8 serves as a prop or fulcrum and the cross bar 5 is lifted carrying with it the rear pointed end portions 4 of the tines which are raised out of the pile of manure and may clear the same as the hook is pulled away from the said pile of manure.

Having thus described the invention, what I claim is:—

A manure hook comprising a forward cross bar, tines pivotally connected at their forward ends with said cross bar and arranged in spaced parallel relation thereon and having downwardly disposed rear end portions, a second cross bar connected with the rear portions of the said tines in advance of the downwardly disposed rear end portion thereof, a lever fulcrumed upon the second mentioned cross bar and a rod pivotally connected at one end with the intermediate portion of the lever and pivotally connected at its opposite end with the intermediate portion of the first mentioned cross bar.

In testimony whereof I affix my signature.

REINHARD FEGEBANK.